United States Patent [19]

Harada

[11] Patent Number: 5,534,973
[45] Date of Patent: Jul. 9, 1996

[54] AUTOMATIC DOCUMENT FEEDER FOR PHOTOCOPIER AND FACSIMILE DEVICE

[75] Inventor: Kentaro Harada, Yokohama, Japan

[73] Assignee: Kabushiki Kaisha Toshiba, Kawasaki, Japan

[21] Appl. No.: 205,960

[22] Filed: Mar. 3, 1994

[30] Foreign Application Priority Data

Mar. 24, 1993 [JP] Japan ................... 5-065254

[51] Int. Cl.⁶ .................................................. G03G 21/00
[52] U.S. Cl. ................................. 355/202; 358/498
[58] Field of Search .................................. 355/202, 313, 355/318; 358/300, 494, 496–498

[56] References Cited

U.S. PATENT DOCUMENTS

| | | | |
|---|---|---|---|
| 4,093,372 | 6/1978 | Guenther | 355/318 X |
| 4,176,945 | 12/1979 | Holzhauser et al. | 355/318 X |
| 4,660,957 | 4/1987 | Ueda et al. | 355/313 |
| 4,794,419 | 12/1988 | Shibazaki et al. | 355/202 |
| 4,885,610 | 12/1989 | Katoh | 355/233 |
| 4,959,731 | 9/1990 | Fukae | 358/300 |
| 5,027,162 | 6/1991 | Kida et al. | 355/320 |
| 5,038,182 | 8/1991 | Tanimoto | 355/320 |
| 5,095,372 | 3/1992 | Silverberg | 358/401 |
| 5,177,546 | 1/1993 | Tsubo | 355/314 |
| 5,339,134 | 8/1994 | Nakamura et al. | 355/202 |

*Primary Examiner*—Robert Beatty
*Attorney, Agent, or Firm*—Limbach & Limbach

[57] ABSTRACT

An automatic document feeder includes a document tray for receiving an original document for photocopying and another original document tray for receiving a document for facsimile for simple operation such that the plurality of paper sheets of the document on the document tray for photocopying are sequentially fed to a document table starting from the last sheet whereas the plurality of paper sheets of the document on the document tray for facsimile are sequentially fed to the document table starting from the first sheet. The feeder also includes a pair of empty sensors and for sensing the presence or absence of a document on the respective document trays and selects either the photocopying mode or the facsimile mode according to a signal from the related empty sensor.

6 Claims, 7 Drawing Sheets

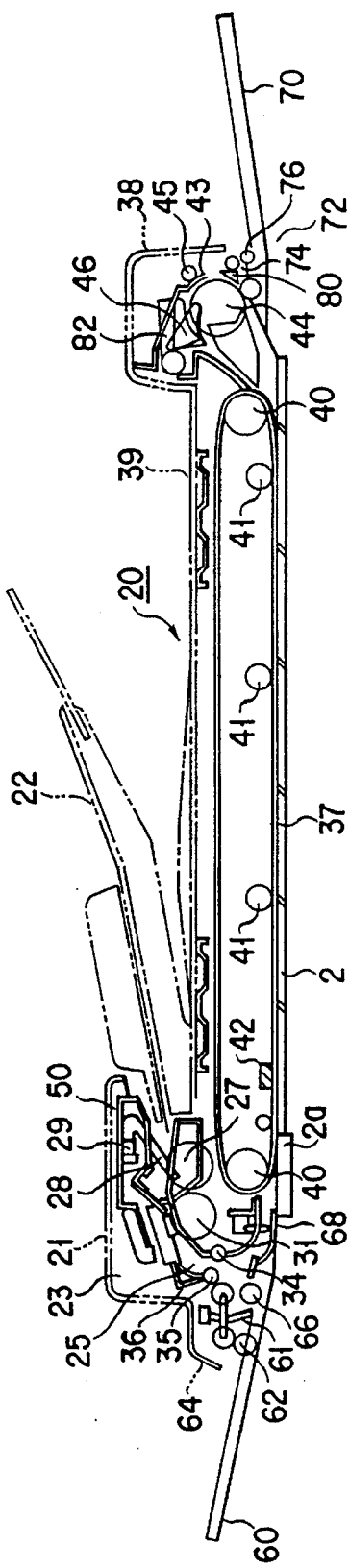
F I G. 1
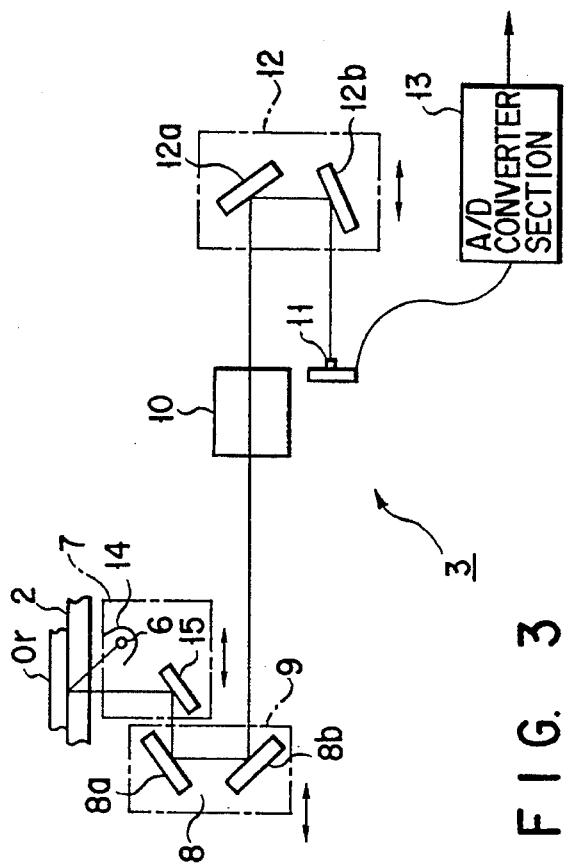
F I G. 3

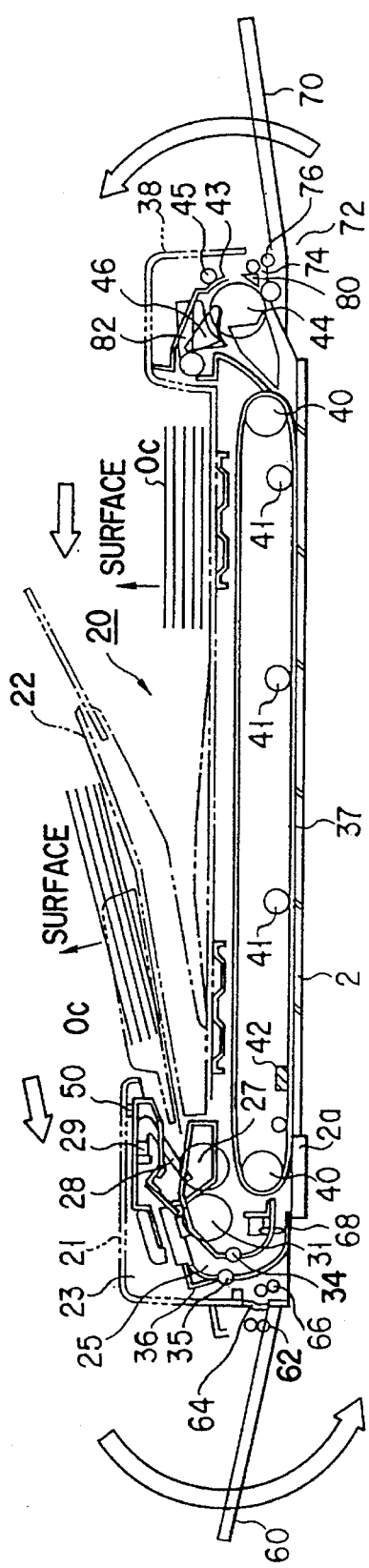
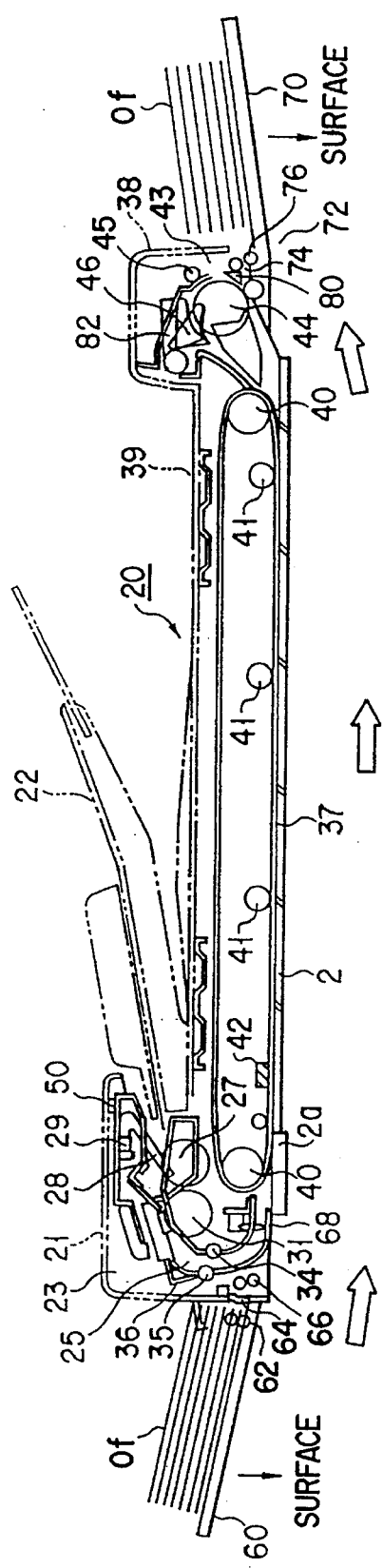
FIG. 2A
FIG. 2B

AUTOMATIC DOCUMENT FEEDER FOR PHOTOCOPIER AND FACSIMILE DEVICE

BACKGROUND OF THE INVENTION

1. Field of the Invention

This invention relates to an image forming apparatus having at least two features of photocopying and facsimile and it also relates to an automatic document feeder to be fitted to such an image forming apparatus.

2. Description of the Related Art

A known image forming apparatus disclosed in U.S. Pat. No. 5,177,546 includes a first document tray and a second document tray along with two feeding paths for the trays which can be switched for use so that the two sets of paper sheets of the documents are not be mixed up. It is, however, an apparatus dedicated to photocopying and the apparatus cannot facsimile. With the apparatus, a set of paper sheets of a document are normally put in each document tray with the last and first pages of the document placed at the bottom and the top thereof such that the sheets are fed to a scanner one by one, the sheet for the last page being fed first, and each sheet is turned up side down to have the right side face and scanned by the scanner located therebelow for photocopying. After the photocopying operation is over, the sheet is ejected out of the apparatus.

If the apparatus is additionally provided with the feature of facsimile, then the following problem will arise. As described above, for photocopying a set of paper sheets, or a document, the sheets are normally placed on a tray with the right side, in other words the desired side to be copied, facing upward and the last page located at the bottom and fed to the scanner one by one starting from the sheet for the last page. The photocopied sheets are then put in a receiving tray one on top of the other so that the original sequence may be maintained. On the other hand, when a set of paper sheets of a document are facsimiled by a facsimile apparatus, the first and the last pages of the document are respectively placed at the bottom and the top, respectively with the right side facing downward. Therefore, when a user who is accustomed to an ordinary facsimile apparatus uses such a dual-feature apparatus to facsimile a document, he or she may fail to place the first page at the bottom of the document, having all the pages face downward, to facsimile the entire document correctly.

The entire document can be facsimiled with such an apparatus only by placing the first page at the bottom and having all the pages face upward. However, all the sheets of the document have to be rearranged to place the first and the last pages at the bottom and the top of the document, respectively and have all the pages face upward. Such a rearranging operation is cumbersome and painstaking.

SUMMARY OF THE INVENTION

In view of the above described circumstances, it is therefore an object of the present invention to provide an automatic document feeder and an image forming apparatus that can selectively operate as a photocopier and a facsimile without involving any cumbersome operation and the risk of mishandling.

An automatic feeding apparatus for feeding an original comprising: first loading means for loading an original; second loading means for loading an another original; first feeding means for sequentially feeding sheets of the original loaded, on the first loading means, starting from the last sheet of the original; and second feeding means for sequentially feeding sheets of original loaded on the second loading means, starting from the first sheet of the original.

An image forming apparatus, comprising: first loading means for loading a first original for photocopying: second loading means for loading a second original for facsimilling; first detecting means for detecting the first original on the first loading means; second detecting means for detecting the second original on the second loading means; first feeding means for sequentially feeding sheets of the first original loaded on the first loading means, starting from the undermost sheet of the first original; second feeding means for sequentially feeding sheets of the second original loaded on the second loading means, starting from the uppermost sheet of the original; image scanning means for scanning one of the original fed by the first feeding means and the second original fed by the second feeding means; photocopying means for photocopying the scanned image of the first original; facsimile means for facsimilling the scanned image of the second original; and means for selectively activating one of the photocopying means and the facsimile means in accordance with the detection by the first or second detecting means.

When the feeding apparatus is used for photocopying, a set of sheets of an original to be photocopied are placed on the first loading tray. The sensing means senses the original on the first loading tray. Under this condition, the sheets of the original on the first loading means are sequentially fed to the predetermined image scanning position for photocopying operation.

When, on the other hand, an automatic feeding apparatus according to the invention is used for facsimile, a set of sheets of an original to be facsimilled are placed on the second loading means. The sensing means senses the document on the second loading means. Under this condition, the sheets of the original on the second loading means are sequentially fed to the predetermined image scanning position for facsimile operation.

Now, the present invention will be described in greater detail by referring to the accompanying drawings that illustrate preferred embodiments of the invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 1 is a schematic lateral view of an automatic document feeder according to the invention.

FIG. 2A is a schematic lateral view of an automatic document feeder according to the invention, illustrating the operation of the feeder for photocopying.

FIG. 2B is a schematic lateral view of the automatic document feeder of FIG. 2A, illustrating the operation of the feeder for facsimile.

FIG. 3 is a schematic diagram of the image forming section of the automatic document feeder of FIGS. 2A and 2B.

DETAILED DESCRIPTION OF THE PREFERRED EMBODIMENTS

Figure 4:
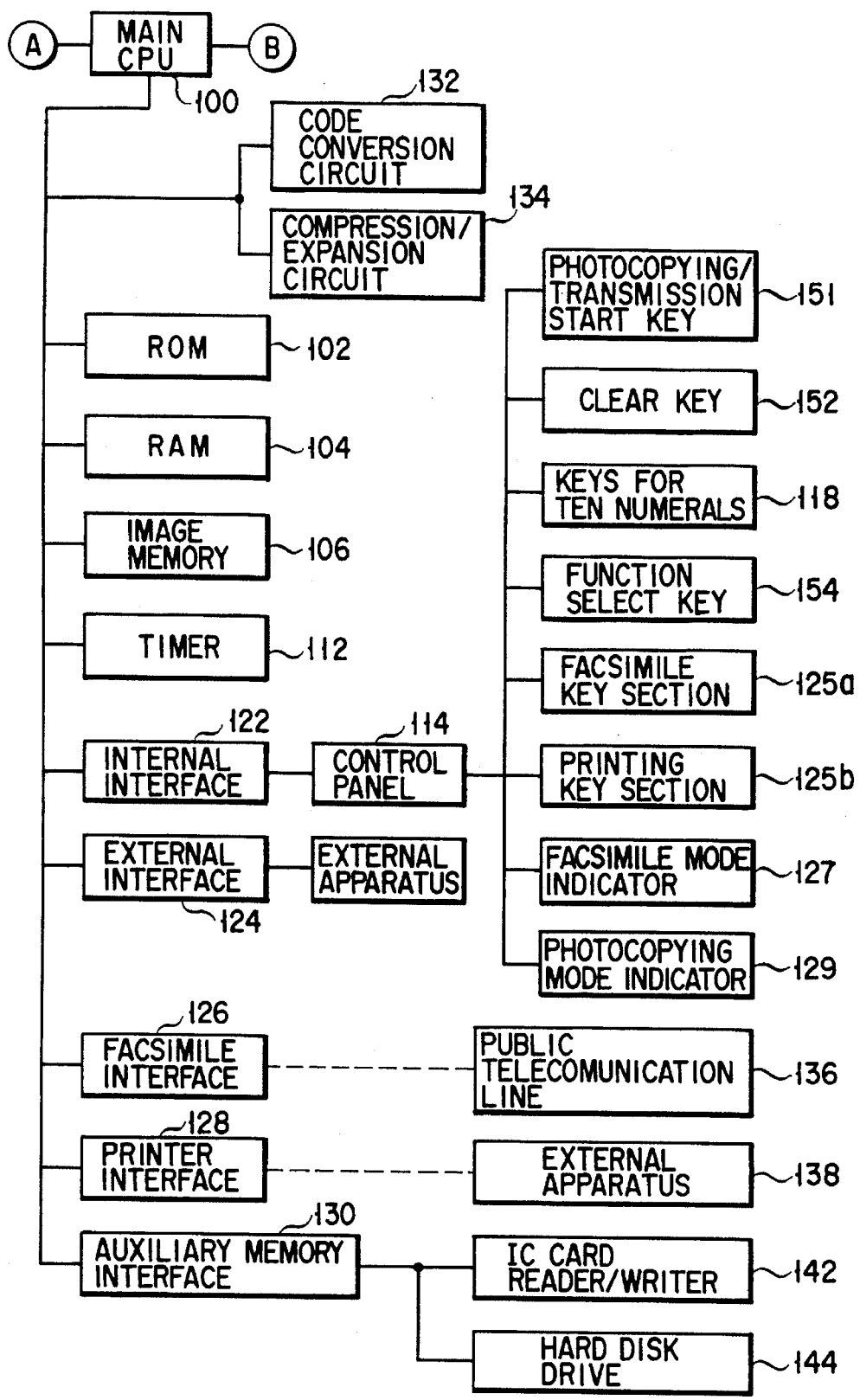
FIGS. 4 though 6 are block diagrams of three different control circuits of an image forming apparatus according to the invention, illustrating the respective circuit configuration.

FIGS. 1, 2A and 2B schematically illustrate an automatic document feeder 20 to be used for an image forming apparatus provided with a facsimile feature and a photocopying feature according to the invention. A document table (of a transparent glass panel) 2 is arranged under the automatic document feeder 20 such that either original document Oc for photocopying or original document Of for facsimile is selectively fed from the automatic document feeder 20 onto the document table 2. A document scanning section 3 is arranged under the document table 2 and scans a set of paper sheets of document Or (which is the document Oc or the document Of, whichever applicable) placed on the document table 2. An image forming section 4 (FIG. 6) is arranged under the scanning section 3.

The automatic document feeder 20 is unitized and housed in a cover main body 21, which has a rear panel swingably fitted to the rear upper edge of the cover main body 21 by means of a hinge (not shown) so that the entire automatic document feeder 20 may be pivoted and displaced to clear the upper surface of the document table 2.

A document tray 22 for carrying an entire document Oc for photocopying is arranged on the top of the cover main body 21 slightly to the left from the center of the table 2 in FIG. 1.

First feeding means 23 is also housed in the cover main body 21 for sequentially feeding the paper sheets of the document Oc to an end of the document table 2 (the left end in FIG. 1) starting from the bottom one, said document Oc being placed on the document tray 22 for photocopying with the right side facing upward.

Said first feeding means 23 has a configuration as described below.

A sheet feeding path 25 having an sidelong U-shaped cross section is arranged to make the lower end (left end) of the inclined document tray 22 for photocopying communicate with the upper surface of a document stopper 2a arranged along the left edge (in FIG. 2) of the document table 2. A pick-up roller 27 for taking out a sheet out of the document Oc for photocopying, a weight board 28 for pressing the pick-up roller 27 against the document Oc for photocopying and an empty sensor 29, or a first document tray sensing switch, for sensing the status of the document Oc for photocopying on the document tray 22 are arranged in an upstream area of the sheet feeding path 25. A feed roller 31 is arranged downstream to the pick-up roller 27 to ensure that the paper sheets of the document Oc are taken out strictly on a one by one basis. An aligning roller 34 and a feeding roller member 35 are arranged in a downstream area of the sheet feeding path 25 to form a resist roller pair for correcting any skew of the sheets of the document Oc for photocopying and the timing of feeding each of them. Additionally, a resist sensor 36 is arranged close to the aligning roller 34 to sense the document Oc for photocopying and determine the timing of operation of the aligning roller 34 and the feeding roller member 35. The feeding roller member 35 contains as an integral part thereof sensing means (as will be described later) for sensing two or more than two sheets (if any) of the document Oc being fed simultaneously (simultaneous feeding) and the size of each sheet of the document Oc as well as any skew thereof.

A document tray 60 for carrying an entire document Of for facsimile is arranged at the left side of the cover main body 21 in FIG. 1.

Second feeding means 61 is arranged for sequentially feeding the paper sheets of the document Of to an end of the document table 2 (the left end in FIG. 1) starting from the bottom one (first one), said document Of being placed on the document tray 60 for facsimile with the right side facing downward.

Said second feeding means 61 comprises, among others, a pick-up roller 62 for taking a sheet out of the document Of for facsimile and an empty sensor 64, or a second document tray sensing switch, for sensing the status of the document Of for facsimile on the document tray 60 arranged along a sheet feeding path 68 communicating with the document table 2. A feed roller 66 is also arranged to ensure that the paper sheets of the document Of are taken out strictly on a one by one basis.

A document conveying belt 37 extends on the top of the document table 2 to cover the latter. Each sheet of the document Oc for photocopying or the document Of for facsimile being fed by the first or second feeding means 23 or 61, respectively, is conveyed from an end (left end) to the other end (right end) of the document table 2, where it is ejected by means of first ejection means 38 arranged at the right of the cover main body 21 into a first ejected document receiving section 39 arranged on the top of the cover main body 21, if it belongs to the document Oc for photocopying, or by means of second ejection means 72 also arranged at the right of the cover main body 21 into a second ejected document receiving section 70 arranged at the right of the cover main body 21, if it belongs to the document Of for facsimile.

The document conveying belt 37 is a wide endless belt having a white outer surface and extending between a pair of belt rollers 40, 40 such that it may be driven to run forward or backward by a belt drive mechanism (not shown) which will be described later. Inside the document conveying belt 37, there are arranged a plurality of tension pulleys 41 for pressing the belt against the document table 2 and a set switch 42 for sensing the status of the automatic document feeder.

The first ejection means 38 for document Oc for photocopying has a configuration as described below. A first document ejecting path 43 having a sidelong U-shaped cross section is arranged to make the right end (FIG. 1) of the document table 2 communicate with the first ejected document receiving section 39 such that each sheet of the document Oc for photocopying is turned upside down to make the right side facing upward before it is ejected. A conveying roller 44, a pinch roller 45 for pressing each of the document Oc for photocopying against the conveying roller 44 and an ejected sheet sensor 46 for detecting the rear end of the sheet being fed to the first ejected document receiving section 39 are arranged at the middle of the first document ejecting path 43. A gate 80 is arranged at the junction of the first document ejecting path 43 and a second document ejecting path 74 which will be described later such that the document Oc for photocopying is led to the first document ejecting path 43 whereas the document Of for facsimile is led to the second document ejecting path 74 by controlling the operation of the gate 80. The first document ejecting path 43 is also provided with a gate 82 for turning each sheet of the document Oc for photocopying upside down so that the both sides of the sheet may be copied.

The second ejection means 72 for document Of for facsimile has a configuration as described below. A second document ejecting path 74 is arranged to make the right end (FIG. 1) of the document table 2 communicate with the second ejected document receiving section 70 such that each sheet of the document Of for facsimile is ejected without being turned upside down. A conveying roller 76 is arranged on the second document ejecting path 74.

The document Oc for photocopying and the document Of for facsimile are detected by the empty sensors 29 and 64, respectively, and the sheets of the former document Oc are sequentially ejected by the first ejection means 38 whereas the sheets of the latter document Of are sequentially ejected by the second ejection means 72.

Reference numeral 50 in FIGS. 1, 2A and 2B denotes a cover switch.

Referring to FIG. 3, the document scanning section 3 comprises a first carriage 7 provided with an exposure lamp 6 that operates as a light source, a second carriage provided with a mirror unit 8 constituted by a number of mirrors for changing a directions of an optical path, a zoom lens 10, another mirror unit 12 for leading a light beam reflected by a sheet of the document Or on the document table 2 to a photoelectric converter section 11 and correcting the optical path length at the time of a change of magnification, the photoelectric converter section 11, a drive system (not shown) for modifying the mutual positional relationship of the above listed components and an A/D converter section 13 for converting analog video signals from the photoelectric converter section 11 into corresponding digital signals. The first carriage 7 is provided with an exposure lamp 6 that emits rays of light toward the sheet of the document Or on the document table 2, a reflector 14, or a mirror, for converging the rays of light from the exposure light 6 on the sheet and a mirror 15 for leading the beam of light reflected by the surface of the sheet to the second carriage 8. Said mirror unit 8 comprises a pair of mirrors 8a and 8b arranged to lead the beam of light coming from the mirror 15 to the zoom lens 10. The first and second carriages 7 and 9 are connected with other by means of a timing belt (not shown) in such a manner that the second carriage 9 moves with the first carriage 7 in a same direction but at a speed half as much as that of the second carriage 9. With such an arrangement, the optical path length up to the zoom lens 10 is always kept constant for scanning operation. The zoom lens 10 has a constant focal length and is designed as to be moved toward the optical axis as a function of the change of magnification. The mirror section 12 is constituted by a pair of mirrors 12a and 12b, which are positionally adjusted according to the optical path length that changes as a function of the selected relative refractive index of the selected magnification. The beam of light coming from the zoom lens 10 is led to the photoelectric converter section 11 by appropriately modifying the path of the light beam by means of the pair of mirrors 12a and 12b. Said photoelectric converter section 11 carries out photoelectric conversion of the light beam reflected by the document Or on the document table 2 and typically comprises a CCD-type line image sensor as a principal component. Note that a picture element of the document Or corresponds to an element of the CCD line image sensor. The output of said photoelectric converter section 11 is fed to the A/D converter section 13. Said first and second carriages 7 and 9 and said pair of mirrors 12a and 12b are driven to move by a stepping motor (not shown). More specifically, said first and second carriages are moved by a timing belt (not shown) extending between a drive pulley (not shown) connected to the rotary shaft of said stepping motor and an idle pulley (not shown). Said zoom lens 10 is moved toward the optical axis by means of a spiral shaft (not shown) connected to and driven by a stepping motor (not shown).

The image forming section 4 is typically constituted by a combination of a laser optical system and an electronic photography system capable of forming images on printing paper. It will be described in greater detail below by referring to FIG. 6.

Figure 5:
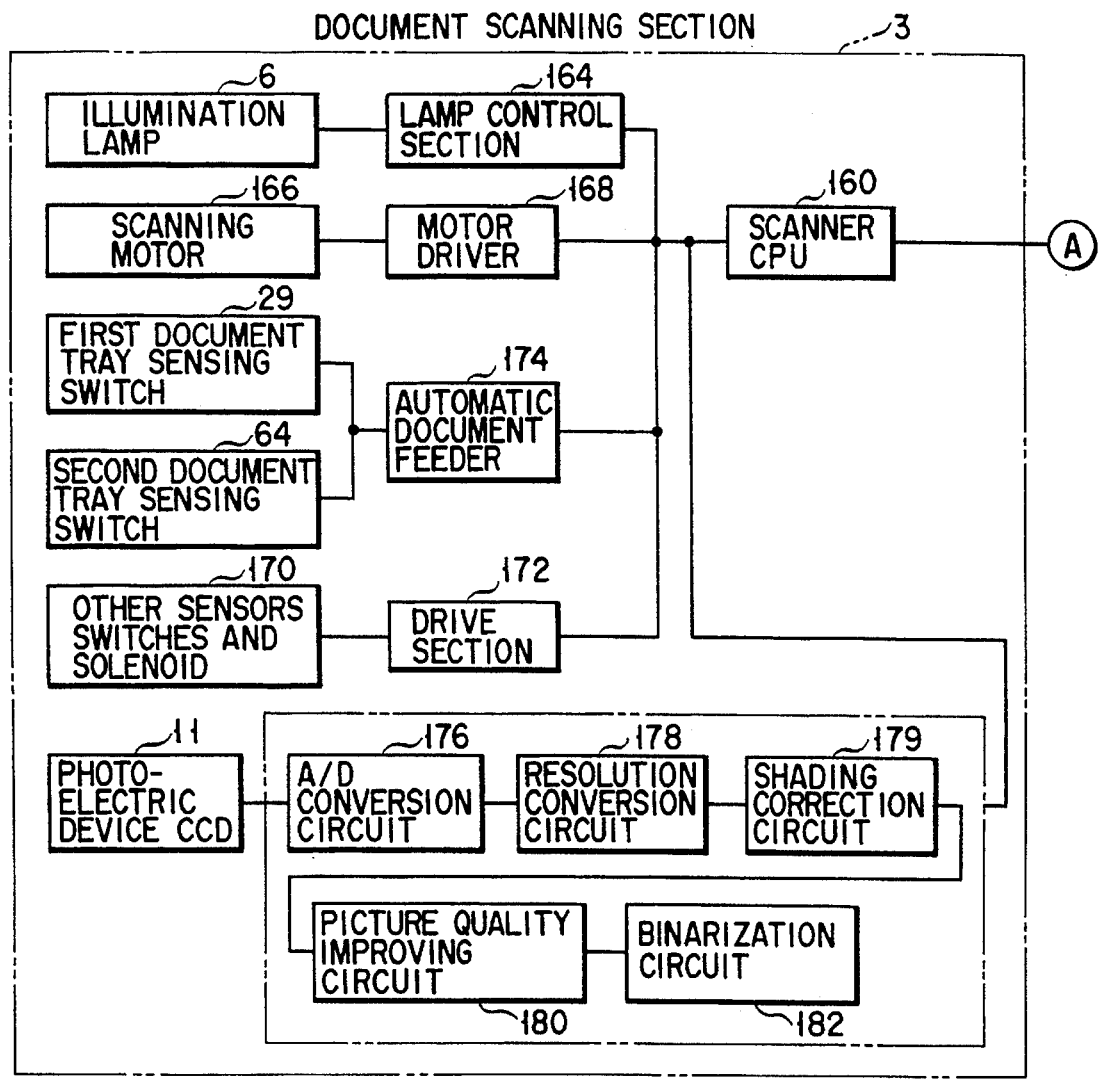
Figure 6:
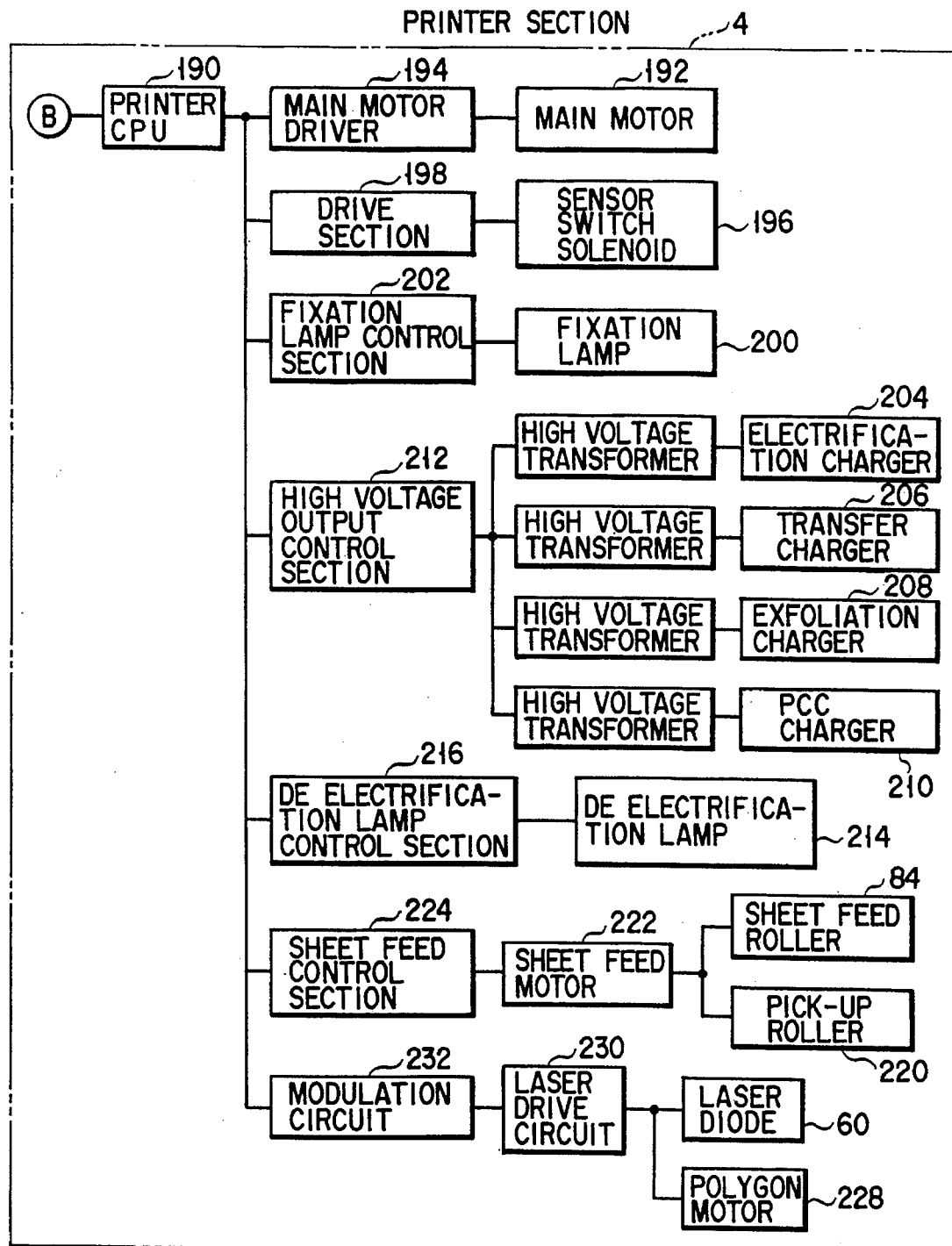

FIGS. 4 though 6 are block diagrams of three different control circuits of an image forming apparatus according to the invention, illustrating the respective circuit configuration, said apparatus being provided with the features of photocopying, facsimile and printing. FIG. 4 is a block diagram for the CPU section including a main CPU 100 whereas FIGS. 5 and 6 are block diagrams for the scanner section connected to a scanner CPU 160 and the printer section (image forming section) connected to a printer CPU 190, respectively. Referring to FIG. 4, the main CPU 100 is connected to a ROM 102, a RAM 104, an image memory 106, a timer 112, an internal interface 122, an external interface 124, a facsimile interface 126, a printer interface 128, an auxiliary memory interface 130, a code conversion circuit 132 and a compression/expansion circuit 134. The internal interface 122 is connected to a control panel 114. The facsimile interface 126 and the printer interface 128 are, respectively, connected to a public telecommunication line 136 and an external apparatus 138, whereas the auxiliary memory interface 130 is connected to an IC card reader/ writer 142, a hard disc drive 144 and other appropriate devices.

Figure 8:
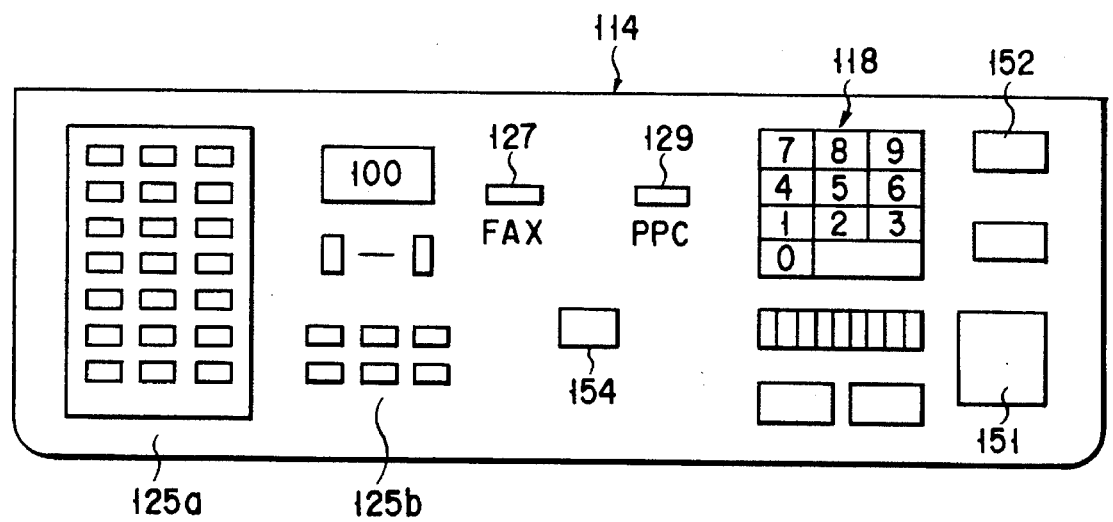
FIG. 8 is a schematic plan view of the control panel of an image forming apparatus according to the invention.

FIG. 8 is a schematic plan view of the control panel 114. Referring to FIG. 8, the control panel 114 includes a photocopying/transmission start key 151, a clear key 152, ten numeral keys 118, a function select key 154, a facsimile key section 125a having a number of keys for the selection of transmission mode, density, destination facsimile number and so on, a printing key section 125b having a number of keys for the selection of the number of sheets to be printed, magnification, density and so on, a facsimile mode indicator 127 and a photocopying mode indicator 129.

Referring to FIG. 5, the scanner CPU 160 is connected to and controls a lamp control section 164 for controlling an illumination lamp 6, a motor driver 168 for controlling a scanning motor 166, an automatic document feeder 174 for driving and controlling a first document tray sensing switch (empty switch 29) and a second document tray sensing switch (empty switch 64) and a drive section 172 for controlling other sensors, switches and solenoids 170. It also is connected to and controls an A/D conversion circuit 176 for processing image data from the photoelectric device 11, a resolution conversion circuit 178, a shading correction circuit 179, a picture quality improving circuit 180 and a binarization circuit 182.

Referring to FIG. 6, the CPU 190 is connected to a main motor driver 194 for driving a main motor 192, a drive section 198 for driving sensors, switches and solenoids 196, a fixation lamp control section 202 for controlling a fixation lamp 200, a high voltage output control section 212 for controlling an electrification charger 204, a transfer charger 206, an exfoliation charger 208 and a PCC charger 210, de-electrification lamp control section 216 for controlling a de-electrification lamp 214, a sheet feed control section 224 for controlling a sheet feed motor 222 for a sheet feed roller 84 and a pick-up roller 220 and a modulation circuit 232 for controlling a laser drive circuit 230 for an electro-optical conversion section (laser diode) 60 and a polygon motor 228.

Upon receiving a signal from either of the empty sensors 29 and 64, the CPU 100 selects the photocopying feature or the facsimile feature. If the photocopying feature is selected, it is shown by the photocopying mode indicator 128 and the CPU 100 makes the gate 80 operate for the first document ejecting path 43 by controlling the first feeding means 31, the document conveying belt 37 and the first sheet ejection means 38. If, on the other hand, the facsimile feature is selected, it is shown by the facsimile mode indicator 127 and the CPU 100 causes the gate 80 to operate for the second document ejection path 74 by controlling the second feeding means 61, the document conveying belt 37 and the second sheet ejection means 72. The photocopying feature and the facsimile feature can be selected by using the function select key 154 on the control panel 114.

Figure 7:
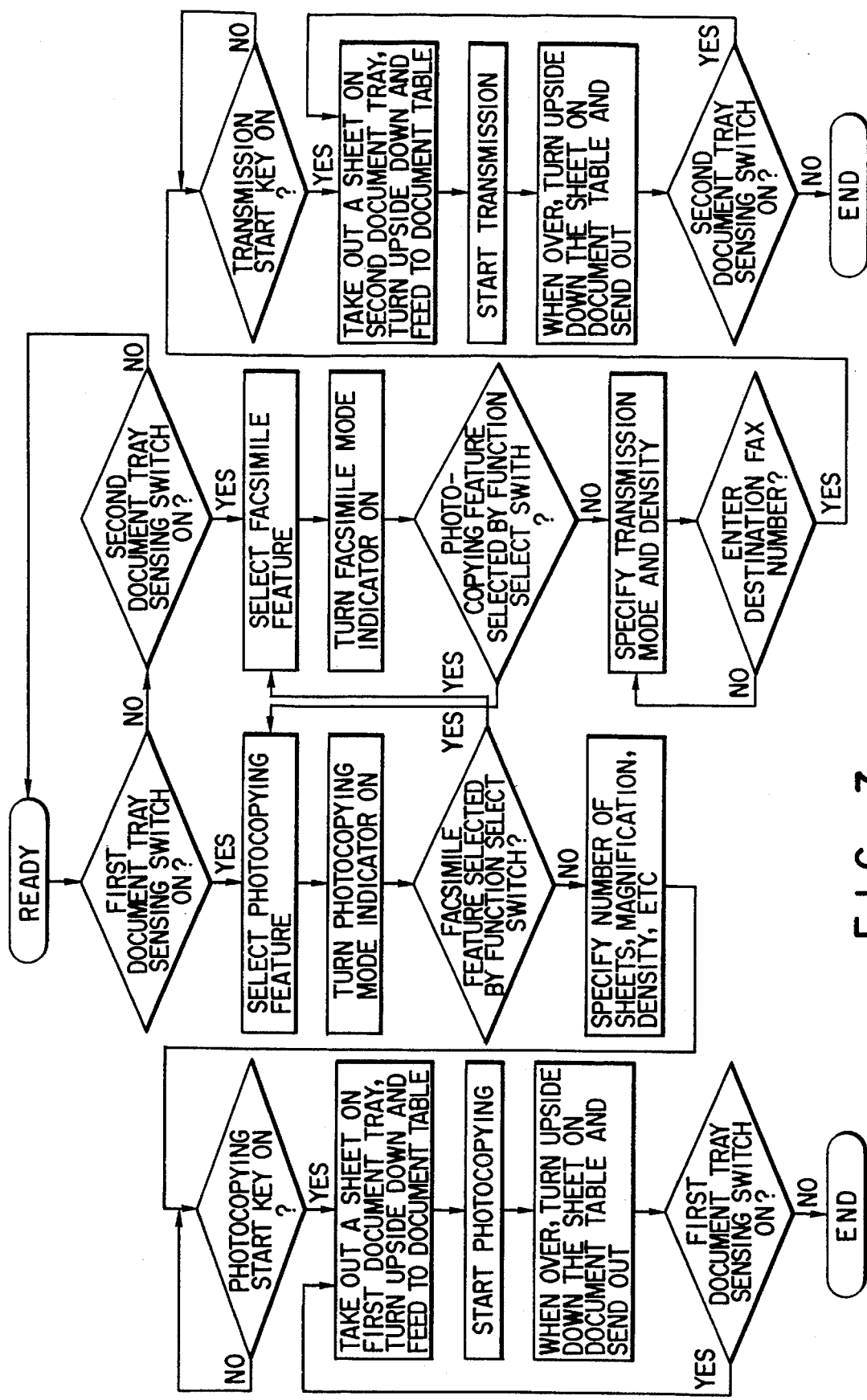
FIG. 7 is a flow chart of operation of an image forming apparatus according to the invention.

The operation of an automatic document feeder 20 having a configuration as described above will be illustrated below by referring to FIGS. 2A, 2B and 7.

FIG. 2A shows how the apparatus operates as a photocopying machine. An entire document Oc for photocopying having a plurality of sheets is placed on the document tray 22 for photocopying with the right side facing upward. As the document Oc is placed on the tray 22, the empty sensor 29 (the first document tray sensing switch) is turned on to select the photocopying feature of the apparatus. This status is indicated by the photocopying mode indicator 128 on the control panel 114. Then, the operator gives necessary data (number of sheets, magnification, density, etc.) to the apparatus through the control panel 114 and thereafter depresses the start key 121 (print button). This activates the pick-up roller 27 and the sheet feed roller 31 so that the bottom sheet of the document Oc for photocopying is taken out of the document tray 22 for photocopying. The sheet is then turned up side down and brought to the underside of the document conveying belt 37 by a resist roller pair, which are in fact the aligning roller 34 and the feeding roller member 35. Meanwhile, the document conveying belt 37 is running toward the document table 2 so that the sheet of the document Oc is fed as far as the document table 2. Thereafter, the document conveying belt 37 is made to run backward with the sheet of the document Oc for a given number of pulse signals transmitted from the set switch 42 in order to cause the sheet to abut the stopper 24. Now, the sheet of the document Oc is placed in position for photocopying. Then, the document scanning section 3 in the main body 1 starts scanning the sheet and the image on the sheet is copied onto a sheet of printing paper by the image forming section 4. After the completion of the photocopying operation, the original sheet of the document Oc is sent further forward by the document conveying belt 37. As described above, the gate 80 is set to operate for the first document ejecting path 43 by the control unit 100 as the photocopying mode is selected. Consequently, the original sheet of the document Oc is ejected into the first ejected document receiving section 39 by the first sheet ejection means 38. As the first sheet of the document Oc is sent out of the document table 2, the empty sensor 29 senses the second sheet of the document Oc and makes it to be sent onto the document table 2. Thus, the above operation is repeated until the last sheet of the document Oc is sent out of the document tray 22 for photocopying.

FIG. 2B illustrates the apparatus operating as a facsimile machine. An entire document Of for facsimile comprising a plurality of sheets is placed on the document tray 60 for facsimile with the right side facing downward. As the document Of is placed on the tray 22, the empty sensor 46 (the second document tray sensing switch) is turned on to select the facsimile feature of the apparatus. This status is indicated by the facsimile mode indicator 127 on the control panel 114. Then, the operator gives necessary data (transmission mode, density, destination facsimile number, etc.) to the apparatus through the control panel 114 and thereafter depresses the start key 121 (transmission button). This activates the pick-up roller 62 and the sheet feed roller 66 so that the bottom sheet of the document Of for facsimile is taken out of the document tray 60 for facsimile. The sheet is then brought to the underside of the document conveying belt 37 and then onto the document table 2. Thereafter, the document conveying belt 37 is made to run backward with the sheet of the document Of for a given number of pulse signals transmitted from the set switch 42 in order to cause the sheet to abut the stopper 24. Now, the sheet of the document Of is placed in position for facsimile. Then, the document scanning section 3 in the main body 1 starts scanning the sheet and the generated facsimile data are sent out to the external destination by way of the telecommunication interface 180. After the completion of the facsimile operation, the sheet of the document Of is sent out of the document table 2 by the document conveying belt 37. As described above, the gate 80 is set to operate for the second document ejecting path 74 by the control unit 100 as the facsimile mode is selected. Consequently, the sheet of the document Of is ejected into the second ejected document receiving section 70 by the second sheet ejection means 72. As the first sheet of the document Of is sent out of the document table 2, the empty sensor 64 senses the second sheet of the document Of and causes it to be sent onto the document table 2. Thus, the above operation is repeated until the last sheet of the document Of is sent out of the document tray 60 for facsimile.

As described above in detail, an automatic document feeder according to the invention comprises a document tray for placing a document for facsimile and a document tray for placing a document for photocopying, which are separated from each other such that the first page of the document for facsimile is taken out first whereas the last page of the document for photocopying is taken out first. Additionally, since either the facsimile mode or the photocopying mode is selected for operation by sensing the document placed on either of the document trays, the entire apparatus always operates correctly for either photocopying or facsimile.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image forming apparatus, comprising:

first loading means for loading a first original document having a first plurality of sheets for photocopying:

second loading means for loading a second original document having a second plurality of sheets for facsimilling;

first detecting means for detecting the first original document on the first loading means;

second detecting means for detecting the second original document on the second loading means;

first feeding means for sequentially feeding each of the first plurality of sheets of the first original document loaded on the first loading means starting from a lowermost sheet of the first original document;

second feeding means for sequentially feeding each of the second plurality of sheets of the second original document loaded on the second loading means starting from a lowermost sheet of the second original document;

image scanning means for scanning the first original document fed by said first feeding means and the second original document fed by said second feeding means;

photocopying means for photocopying a scanned image of the first original document;

facsimile means for facsimilling a scanned image of the second original document; and means for selectively activating one of the photocopying means and the facsimile means in accordance with detection by said first or second detecting means.

2. An image forming apparatus according to claim 1, further comprising:

first ejection means for ejecting the first original document fed by the first feeding means; and second ejection means for ejecting the second original document fed by the second feeding means.

3. An image forming apparatus according to claim 1, wherein:

said first loading means includes means for loading the first original document with an image carrying side facing upward;

said second loading means includes means for loading the second original document with an image carrying side facing downward; and said first feeding means includes means for turning each sheet of the first plurality of sheets of the original document upside down.

4. An image forming apparatus according to claim 1, further comprising:

means for placing each sheet of the first original document and the second original document fed by the first and second feeding means, respectively, to an image scanning position; and means for turning each of the sheets of the first original document placed in the image scanning position upside down and replacing each such sheet in the image scanning position.

5. An image forming apparatus according to claim 1, said apparatus further comprising:

indicator means for indicating that the photocopying means is selected when the first original document is sensed by said first sensing means and that the facsimile means is selected when the second original document is sensed by said second sensing means.

6. A method of forming an image, comprising steps of:

loading a plurality of sheets of an original document on first loading means or second loading means, the plurality of sheets having a first sheet and a last sheet;

sensing an original document on the first loading means by a first sensing means and sensing an original document on the second loading means by a second sensing means;

selecting an original photocopying mode when the original document is sensed on the first loading means and a facsimile mode when the original document is sensed on the second loading means;

feeding sequentially the plurality of sheets of the original document loaded on the first loading means starting from the last sheet of the original document when the original document is sensed on the first loading means;

feeding sequentially sheets of the original document loaded on the second document loading means starting from the first sheet of the original document when the original document is sensed on the second loading means;

photocopying an image of the original document in an image scanning position when the original document is sensed by said first sensing means; and facsimilling the image of the original document in the image scanning position when the original document is sensed by said second sensing means.

* * * * *